UNITED STATES PATENT OFFICE.

MAX PLATSCH, OF FRANKFORT-ON-THE-MAIN, GERMANY.

PROCESS OF MAKING BRIQUETS.

1,084,479. Specification of Letters Patent. Patented Jan. 13, 1914.

No Drawing. Application filed March 13, 1913. Serial No. 754,008.

*To all whom it may concern:*

Be it known that I, MAX PLATSCH, chemist and doctor of philosophy, and a citizen of the German Empire, and resident of Frankfort-on-the-Main, Germany, with the post-office address Bettinastrasse 3, have invented new and useful Improvements in Processes of Making Briquets, of which the following is a specification.

Many attempts have been made to introduce a concentrated sulfite cellulose liquor into the briquet industry as a binding material; the application of the liquor in this direction, however, has not been extensive, because the binding material always remains soluble in water. A briquet thoroughly unattacked by water has only been obtained hitherto by coking the binding material. This operation, however, has necessitated a high temperature of about 300° C. and upward, which apart from the fact that combustion often ensues produces in many materials, such as coal, changes which are disadvantageous.

By the present invention cellulose sulfite liquor and therefore coal briquets, ore briquets or the like made therewith can be rendered resistant to water at a temperature of about 100° C.

It is known that free sulfuric acid decomposes the liquor when heated therewith, so that products are formed which are insoluble in water. Since by addition of sulfuric acid the bases of the liquor, and in the first instance the lime, are converted into sulfates, free sulfuric acid only appears after all the bases have been thus converted. When sulfuric acid is mixed with the concentrated liquor the greatest part of the lime is precipitated as calcium sulfate. After separating this sulfate a purified liquor is obtained. If this purified liquor contains a small excess of sulfuric acid a briquet made with use of the liquor as the binding material is unattacked by water if the briquet has been dried, with or without application of a vacuum, at about 100° C. During the drying the sulfuric acid is evolved as sulfurous acid and there remain carbon compounds insoluble in water which were originally contained in the liquor. This process does not occupy more time for the manufacture of a briquet stable to water than is occupied by direct coking, and it yields the desired result at temperatures which are essentially lower than those required in known processes. The new process also involves an important removal of lime and recovery of calcium sulfate. The removal of lime is of great importance for the permanence of ore briquets and coal briquets as well as for the combustibility of the latter.

It has already been proposed to add to the sulfite liquor 15 per cent. of concentrated sulfuric acid, but there is no suggestion of separating the calcium sulfate and the proposition is to coke at a temperature not exceeding 200° C. It is clear that such a considerable excess of free sulfuric acid, added to the sulfite liquor, cannot be decomposed to sulfurous acid by merely drying at about 100° C.; a far higher temperature must be necessary for the purpose. A decomposition of the binding agent at about 100° C., so as to produce insolubility in water, is only possible when there is quite a small excess of sulfuric acid, which is easily insured by taking into consideration the content of lime in the particular liquor. As sulfuric acid decomposes hot sulfite liquor in such a manner that organic substances insoluble in water separate, which no longer possess binding capacity, it is essential to add the sulfuric acid before the briqueting operation in the cold or while cooling in order to avoid loss of binding agent. If this precaution is taken all the organic constituents of the liquor remain in solution and useless loading of the briquet with constituents of the liquor that have no binding action is obviated.

It is known that the constituents of sulfite cellulose liquor in contrast with all tarry agglutinants have a very small calorific value. The sulfite liquor is used therefore in briqueting merely on account of the infusibility and non-volatility of the binding agent during the storage of the briquets as well as on account of the smokeless combustion of its dry products. Therefore it is of importance to add to the briquet the smallest possible quantity of the constituents of the liquor, both from the point of view of economy and in respect of the maintenance of a high calorific value in a coal briquet; on the other hand in the case of an ore briquet a higher admixture of carbonaceous matter may be advantageous.

By addition of sulfuric acid to concentrated sulfite cellulose liquor all the combined acids, such as formic acid, acetic acid or sulfurous acid are liberated. These volatile acids are evolved during the drying of the briquet and may be recovered in a concentrated form in known manner.

Now what I claim and desire to be secured by Letters Patent is the following:

The process of making briquets which consists in adding to a concentrated solution of sulfite cellulose sufficient sulfuric acid to precipitate the lime as calcium sulfate and leave a slight excess of sulfuric acid present, removing the precipitated lime, adding the binding agent so formed to the material to be briqueted, then briqueting the same and drying the briquet at a temperature of about 100° C.

In testimony, that I claim the foregoing as my invention, I have signed my name in presence of two witnesses, this twenty sixth day of February 1913.

MAX PLATSCH.

Witnesses:
 EVA SATTLER,
 HERMANN WEIL.